(12) United States Patent
Pan et al.

(10) Patent No.: US 8,743,748 B2
(45) Date of Patent: Jun. 3, 2014

(54) METHOD AND APPARATUS FOR IMPLEMENTING INDICATION OF UPLINK TRANSMISSION TIMING ADVANCE

(75) Inventors: Xueming Pan, Beijing (CN); Shiqiang Suo, Beijing (CN); Yu Ding, Beijing (CN); Yuexia Song, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 299 days.

(21) Appl. No.: 12/990,262

(22) PCT Filed: Apr. 28, 2009

(86) PCT No.: PCT/CN2009/071534
§ 371 (c)(1),
(2), (4) Date: Oct. 29, 2010

(87) PCT Pub. No.: WO2009/132580
PCT Pub. Date: Nov. 5, 2009

(65) Prior Publication Data
US 2011/0051633 A1 Mar. 3, 2011

(30) Foreign Application Priority Data

Apr. 30, 2008 (CN) .......................... 2008 1 0105685

(51) Int. Cl.
| | | |
|---|---|---|
| H04J 3/00 | (2006.01) | |
| H04J 3/06 | (2006.01) | |
| H04B 17/00 | (2006.01) | |
| H04W 72/00 | (2009.01) | |
| H04B 15/00 | (2006.01) | |
| H04W 72/04 | (2009.01) | |
| H04W 56/00 | (2009.01) | |

(52) U.S. Cl.
CPC ........ *H04W 72/0446* (2013.01); *H04W 56/003* (2013.01); *H04W 56/0045* (2013.01); *H04W 56/0055* (2013.01)
USPC ........... 370/280; 370/508; 370/350; 370/336; 370/337; 455/502; 455/67.11; 455/450

(58) Field of Classification Search
CPC .................. H04L 27/2646; H04L 2012/5674; H04W 56/003–56/0055
USPC ............... 370/336–337, 350, 508; 455/67.11, 455/450, 502
See application file for complete search history.

(56) References Cited

U.S. PATENT DOCUMENTS

| | | | | |
|---|---|---|---|---|
| 8,077,670 | B2 * | 12/2011 | Fan et al. ....................... | 370/330 |
| 2001/0036168 | A1 * | 11/2001 | Terry ............................. | 370/337 |
| 2003/0078062 | A1 * | 4/2003 | Burr .............................. | 455/502 |
| 2004/0151143 | A1 * | 8/2004 | Abdesselem et al. ......... | 370/336 |
| 2005/0053099 | A1 * | 3/2005 | Spear et al. ................... | 370/508 |
| 2007/0149206 | A1 * | 6/2007 | Wang et al. ................... | 455/450 |
| 2007/0293157 | A1 * | 12/2007 | Haartsen et al. ........... | 455/67.11 |
| 2008/0080472 | A1 * | 4/2008 | Bertrand et al. .............. | 370/344 |
| 2009/0232236 | A1 * | 9/2009 | Yamamoto et al. ........... | 375/260 |
| 2009/0296609 | A1 * | 12/2009 | Choi et al. .................... | 370/281 |
| 2010/0020786 | A1 * | 1/2010 | Futaki et al. .................. | 370/350 |

FOREIGN PATENT DOCUMENTS

| | | |
|---|---|---|
| CN | 1466285 A | 1/2004 |
| CN | 101154984 A | 4/2008 |

OTHER PUBLICATIONS

Ericsson: "On UL/DL frame timing for TDD", 3GPP Draft; R1-081563, 3rd Generation Partnership Project (3GPP), Mobile Competence Centre; 650, Route Des Lucioles; F-06921 Sophia-Antipolis Cedex; France, vol. RAN WG1, No. Shenzhen, China; Mar. 27, 2008; XP050109978, paragraph [0001]-paragraph [0003]; figure 1.

Ericsson et al; "On timing advance offsets for TDD and HD", 3GPP Draft; R1-081679, 3rd Generation Partnership Project (3GPP), Mobile Competence Centre; 650, Route Des Lucioles; F-06921 Sophia-Antipolis Cedex; France, vol. RAN WG1, No. Shenzhen, China; Apr. 9, 2008; XP050110066; paragraph [0001]-paragraph [0002].

Ericsson; "Maximum timing advance for TDD", 3GPP Draft; R1-080889, 3rd Generation Partnership Project (3GPP), Mobile Competence Centre; 650, Route Des Lucioles; F-06921 Sophia-Antipolis Cedex; France, vol. RAN WG1, No. Sorrento, Italy; Feb. 6, 2008; XP050109364; paragraph [0001]-paragraph [0002].

CWTS STD-TDD-25.224 V5.3.0 (Mar. 2003) Technical Specification; China Wireless Telecommunication Standard (CWTS); Working Group 1 (WG1); Physical Layer Procedures (TDD) (Release 5); 45 pages.

First Korean Office Action; Application No. 10-2010-7026775; 6 pages, Dec. 26, 2011.

First Chinese Office Action; Application No. 200810105685.0; 8 pages, Mar. 19, 2012.

* cited by examiner

*Primary Examiner* — Jung Park
*Assistant Examiner* — Chuong M Nguyen
(74) *Attorney, Agent, or Firm* — Ladas & Parry LLP

(57) ABSTRACT

The present invention provides a method for implementing uplink transmission TA. The method includes: receiving, by a UE, a TA command, adding a TA value corresponding to the TA command and a pre-configured TA adjusting offset to obtain a practical uplink transmission timing advance TA'; and transmitting, by the UE, uplink data according to the TA'. The present invention also provides another method for implementing uplink transmission TA. Compared with the prior art, in the methods provided by the present invention, a TA adjustment indicating table is respectively configured in the eNodeB and the UE, and some items of the TA adjustment indicating table are commonly-used by a TDD system and an FDD system. The present invention also provides apparatuses for implementing uplink transmission TA. The present invention provides detailed solutions for implementing uplink transmission TA in the TDD system and achieves coherence between the designs of the TDD system and the FDD system to the largest extent.

8 Claims, 5 Drawing Sheets

METHOD AND APPARATUS FOR IMPLEMENTING INDICATION OF UPLINK TRANSMISSION TIMING ADVANCE

FIELD OF THE INVENTION

The present invention relates to mobile communication techniques, and more particularly, to a method and an apparatus for implementing indication of uplink transmission timing advance.

BACKGROUND OF THE INVENTION

Systems adopting Orthogonal Frequency Division Multiplexing (OFDM) require an eNodeB to receive signals from multiple User Equipment (UEs) "synchronously", i.e., uplink signals of the multiple UEs should arrive at the eNodeB at the same time, so as to achieve orthogonality among uplink data transmitted at the same time by different UEs. Specifically, in implementation, it needs to be guaranteed that the difference between the time of arrival of data transmitted by different UEs to the eNodeB in the same uplink sub-frame is kept within the range of a Cyclic Prefix (CP). Since the UEs are in various distances from the eNodeB, transmission clock of each UE needs to be adjusted so that a UE far from the eNodeB starts to transmit earlier and a UE closer to the eNodeB starts to transmit later, and this process is referred to as uplink synchronization or timing alignment. To be specific, the eNodeB transmits a Timing Advance (TA) to each UE, and the UE decides the start time of an uplink sub-frame transmission according to the TA.

In a Frequency Division Duplex (FDD) system, the uplink transmission TA is only relevant to the position of the UE in the cell. The position of the UE in the cell determines the time taken by a radio signal to take a round trip between the UE and the eNodeB which is denoted as $T_{RTT}$.

$T_{RTT}=2\times D/C$, where D is the distance between the UE and the eNodeB, C is the speed of light, i.e., $C=3\times 10^8$ m/s.

Propagation delay $T_{prop}=0.5\times T_{RTT}=T_{RTT/2}$.

As shown in FIG. 1, downlink data transmitted by the eNodeB to the UE arrive at the UE after a propagation delay of $T_{prop}=T_{RTT/2}$, thus a frame timing clock of the receiver of the UE is late than the clock of the eNodeB by $T_{RTT/2}$.

Likewise, uplink data transmitted by the UE arrive at the eNodeB also after a delay of $T_{RTT/2}$. In order to make the uplink data transmitted by the UE accurately fall in an uplink sub-frame reception window of the eNodeB, uplink data transmission should be started by the UE $T_{RTT}$ earlier than the downlink frame timing, and the amount of time in advance is the TA.

In a Time Division Duplex (TDD) system, due to the existence of uplink/downlink switching, besides the position of the UE in the cell, the timing advance is also relevant to the time taken by the eNodeB to switch from reception to transmission. Due to the uplink/downlink switching which is implemented by switching of radio frequency devices in the eNodeB and the UE, downlink-to-uplink guard period ($T_{DU}$) and uplink-to-downlink guard period ($T_{UD}$) are needed. The eNodeB does not transmit/receive data within the guard periods. Specifically, the value of each guard period is:

$$T_{DU}=\max(T_{RTT}+T_{UE,Rx-Tx}, T_{eNodeB,Tx-Rx}) \quad (1)$$

$$T_{UD}=\max(T_{UE,Tx-Rx}, T_{eNodeB,Rx-Tx}) \quad (2)$$

where the $T_{UE,Rx-Tx}$ denotes the time taken by the UE to switch from reception to transmission; $T_{eNodeB,Tx-Rx}$ denotes the time taken by the eNodeB to switch from transmission to reception; $T_{UE,Tx-Rx}$ denotes the time taken by the UE to switch from transmission to reception; $T_{eNodeB,Rx-Tx}$ denotes the time taken by the eNodeB to switch from reception to transmission. The above four parameters are determined by performances of the eNodeB and the UE, and will be determined in the standards as a time template, e.g., as the typical values shown in Table 1 which are in unit of microsecond (μs)

TABLE 1

| $T_{eNodeB,Tx-Rx}$ [μs] | $T_{UE,Rx-Tx}$ [μs] | $T_{UE,Tx-Rx}$ [μs] | $T_{eNodeB,Rx-Tx}$ [μs] |
|---|---|---|---|
| 10-15 | 10-40 | 10-20 | 10-20 |

Existing LTE TDD systems have only one Guard Period (GP). The GP includes both the downlink-to-uplink guard period $T_{DU}$ and the uplink-to-downlink guard period $T_{UD}$, i.e., $$GP=T_{DU}+T_{UD}$$

But in practice, $T_{UD}$ is implemented by advance of an uplink reception timing window at the eNodeB. As shown in FIG. 2, the time interval between the downlink transmission window and uplink reception window is $T_{DU}$, and the time interval between the uplink reception window and the next downlink transmission window is $T_{UD}$. Downlink data transmitted by the eNodeB are received by the UE after a delay of $T_{RTT/2}$. For a UE, in order to make uplink data transmitted by the UE fall accurately in the reception window of the eNodeB, uplink transmission TA of the UE should be $T_{TA}=T_{RTT}+T_{UD}$. That is to say, different from the FDD systems, timing advance of the UE in TDD systems depends not only on the position of the UE in the cell but also on the uplink-to-downlink guard period. In the prior art, there is no detailed solution for indicating timing advance in the TDD system.

SUMMARY OF THE INVENTION

In view of the above, the present invention provides a method and an apparatus for implementing indication of uplink transmission timing advance, applicable for a Time Division Duplex (TDD) system.

According to an embodiment of the present invention, a method for implementing indication of uplink transmission timing advance is provided. The method includes: receiving, by a User Equipment (UE), a TA command, adding a TA value corresponding to the TA command and a pre-configured TA adjusting offset to obtain a practical uplink transmission timing advance TA'; and transmitting, by the UE, uplink data according to the TA'.

According to another embodiment of the present invention, a UE for implementing the uplink transmission TA is provided. The UE includes: a command receiving module, adapted to receive a Timing Advance (TA) command from an eNodeB; an offset adjusting module, adapted to configure and store a TA adjusting offset, and add a TA value corresponding to the TA command and the TA adjusting offset to obtain a practical uplink transmission timing advance TA'; and an uplink data transmitting module, adapted to transmit uplink data according to the TA' obtained by the offset adjusting module.

According to still another embodiment of the present invention, a method for implementing indication of uplink transmission TA is provided. The method includes: respectively configuring, in an eNodeB and a User Equipment (UE), a TA adjustment indicating table, wherein some items of the TA adjustment indicating table are commonly-used a Time Division Duplex (TDD) system and a Frequency Division Duplex (FDD) system; performing, by the eNodeB, a synchronization detection on uplink data transmitted by the UE, determining a TA for a next uplink transmission of the UE, mapping the TA to a TA command according to the TA adjustment indicating table configured in the eNodeB, and transmitting the TA command to the UE; searching, by the UE, the TA adjustment indicating table configured in the UE for a TA value corresponding to the TA command received; and performing, by the UE, the next uplink transmission according to the TA value searched out.

According to yet another embodiment of the present invention, an eNodeB and a UE for implementing uplink transmission TA are provided. The eNodeB includes: a Timing Advance (TA) adjustment indicating module, adapted to configure and store a TA adjustment indicating table, wherein the TA adjustment indicating table includes a relationship between a TA command and a TA, and some items of the TA adjustment indicating table are commonly-used a Time Division Duplex (TDD) system and a Frequency Division Duplex (FDD) system; a synchronization detecting module, adapted to perform a synchronization detection on uplink data received, and determine a TA for a next uplink transmission of a User Equipment (UE) based on a detected result; a mapping module, adapted to search the TA adjustment indicating table in the TA adjustment indicating module for a TA command corresponding to the TA determined by the synchronization detecting module; and a TA indicating module, adapted to transmit the TA command obtained by the mapping module to the UE.

The UE includes: a Timing Advance (TA) adjustment indicating module, adapted to configure and store a TA adjustment indicating table, wherein the TA adjustment indicating table includes a relationship between a TA command and a TA, and some items of the TA adjustment indicating table are commonly-used a Time Division Duplex (TDD) system and a Frequency Division Duplex (FDD) system; a command receiving module, adapted to receive a TA command from an eNodeB; a mapping module, adapted to search the TA adjustment indicating table in the TA adjustment indicating module for a TA value corresponding to the TA command received by the command receiving module; and an uplink data transmitting module, adapted to transmit uplink data according to the TA value obtained by the mapping module.

It can be seen from the above technical scheme, embodiments of the present invention configure a TA adjusting offset in the UE, the UE adjusts a received TA to obtain a practical uplink timing advance; or the TA in the TDD system may be obtained by utilizing a TA adjustment indicating table commonly-used by the TDD system and an FDD system. Embodiments of the present invention provide detailed solutions for implementing indication of uplink transmission TA in the TDD system and achieve coherence between the designs of the TDD system and the FDD system to the largest extent.

DETAILED DESCRIPTION OF THE INVENTION

Since timing advance in a TDD system is different from that in an FDD system, embodiments of the present invention provide a solution for implementing indication of uplink transmission timing advance in the TDD system. The solution can satisfy practical requirements of the TDD system while remaining within the framework of implementation of uplink transmission timing advance of the FDD system.

The present invention will be described in detail hereinafter with reference to accompanying drawings to make the technical solution and merits therein clearer.

A first embodiment: an eNodeB side performs the same processing with that in an FDD system while TA is adjusted at a UE side to satisfy the requirements of the TDD system.

In this embodiment, a TA indication is transmitted by the eNodeB side in the same manner as in the FDD system, i.e., a TA dynamic range, a TA granularity, a TA command, and a value represented by each item are the same as their counterparts in the FDD system. $T_{UD}$ may be configured in the UE as a static parameter. The value of $T_{UD}$ may be obtained according to Equation (2) and a time template, e.g. Table 2, defined in specifications. And the $T_{UD}$, is stored in the UE as a static value. After receiving a TA from the eNodeB, the UE adds the TA and $T_{UD}$ to obtain $TA'=TA+T_{UD}$, and takes the TA' obtained as the practical uplink transmission TA for determining the start time of the uplink transmission.

Figure 1:
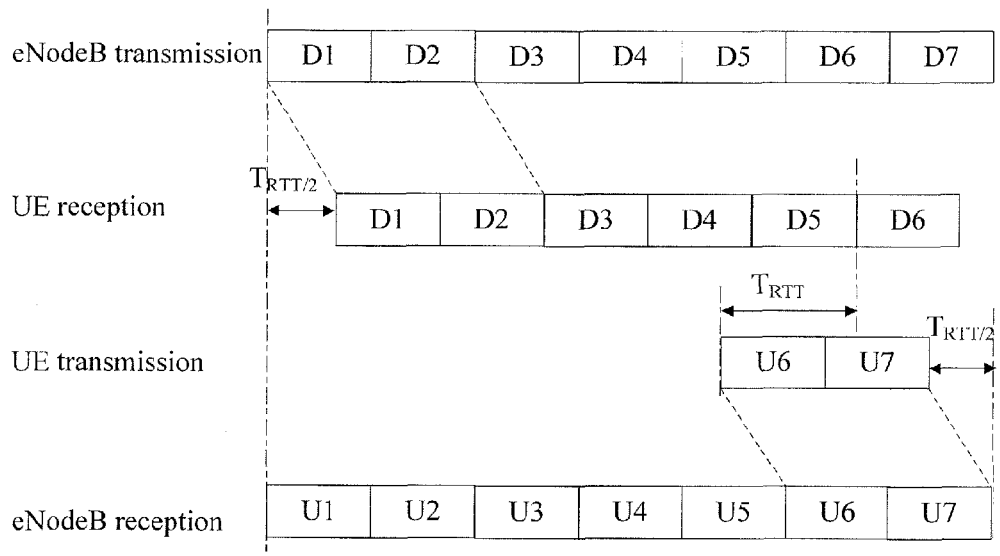
FIG. 1 is a schematic diagram illustrating generation of propagation delay in an FDD system.
Figure 2:
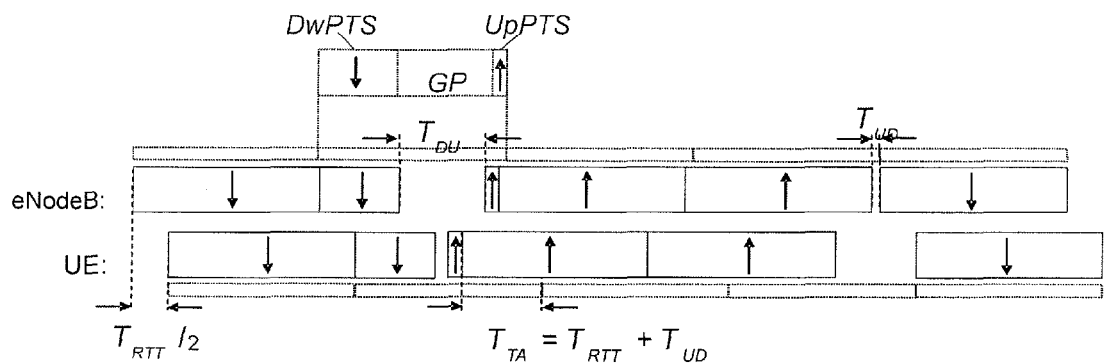
FIG. 2 is a schematic diagram illustrating the relationship between timing advance in a TDD system and a propagation delay and a guard period.
Figure 3:
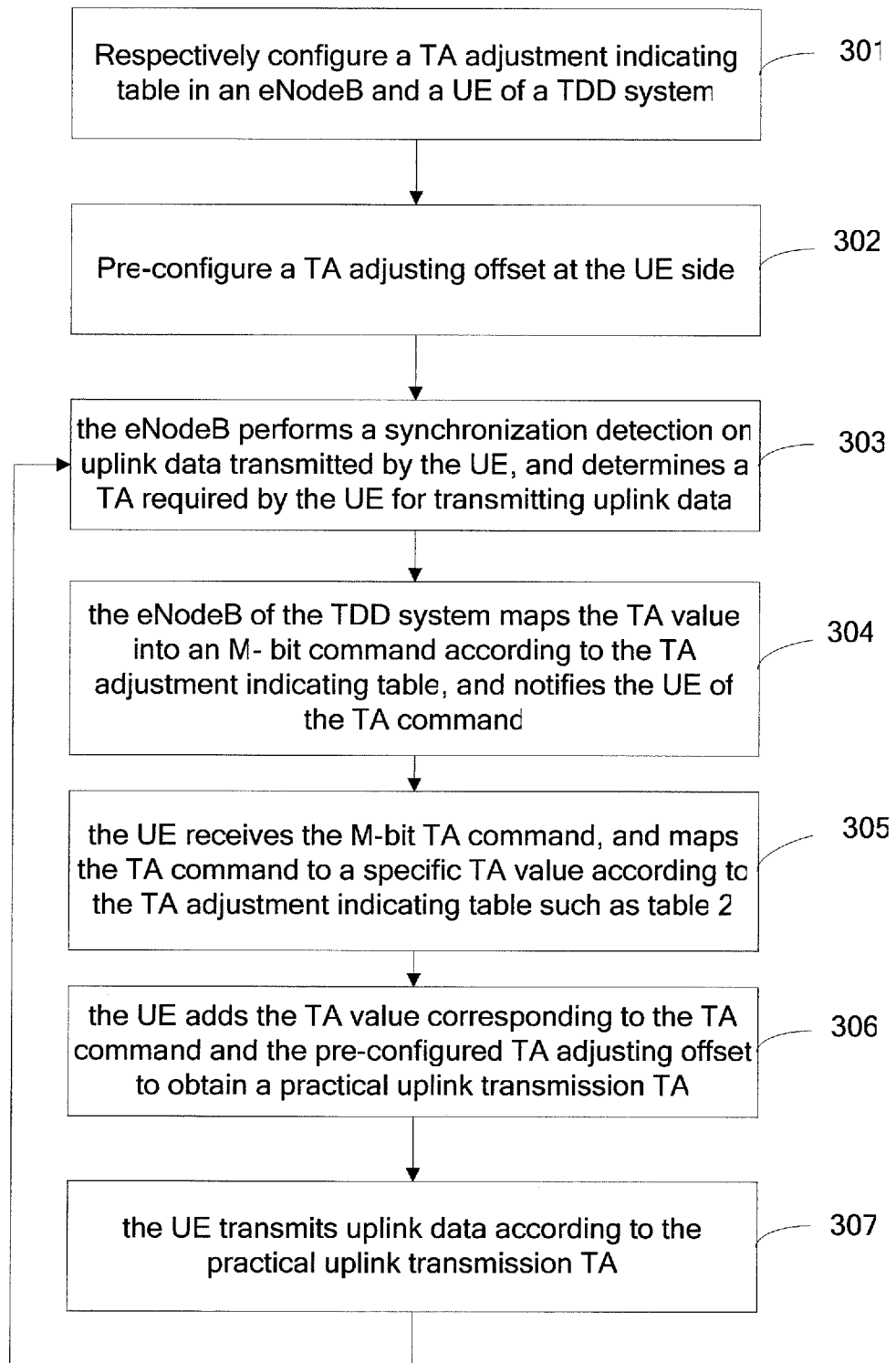
FIG. 3 is a flowchart illustrating a method for implementing indication of uplink transmission timing advance in accordance with a first embodiment of the present invention.

FIG. 3 is a flowchart illustrating a method for implementing indication of uplink transmission timing advance in accordance with the first embodiment of the present invention, including the following steps.

Step 301, respectively configure a TA adjustment indicating table in an eNodeB and a UE of a TDD system in advance, wherein the TA adjustment indicating table includes a relationship between a TA command and a TA value. Table 2 shows an exemplary TA adjustment indicating table. Each item in Table 2 may be configured the same with that in the FDD system, i.e., the quantification level, the granularity, the dynamic range and TA adjustment value corresponding to each TA command are the same with those in the FDD system.

TABLE 2

| Serial number | TA command | TA value (us) |
|---|---|---|
| 0 | 00000000000 | 0 |
| 1 | 00000000001 | 0.52 |
| 2 | 00000000010 | 1.04 |
| 3 | 00000000011 | 1.56 |
| ... | ... | ... |
| 1281 | 10100000001 | 666.12 |
| 1282 | 10100000010 | 666.64 |

TABLE 2-continued

| Serial number | TA command  | TA value (us) |
|---------------|-------------|---------------|
| 1283          | 10100000011 | 667.16        |
| N/A           | N/A         | N/A           |

For a UE at the edge of a cell in the FDD system, a maximum timing advance $TA_{\_max\_FDD} = T_{RTT\_max}$ is required. Suppose the TA adjustment granularity is delta_TA, a command of $M = \lceil (\log_2[1+TA_{\_max\_FDD}/\text{delta\_TA}]) \rceil$ bits is required for quantifying and indicating all TA values within a dynamic range of the TA $[0, TA_{\_max\_FDD}]$, where the symbol $\lceil\ \rceil$ denotes a round-up function. For example, a maximum cell radius of 100 km supported by LTE has $T_{RTT\_max} = 2*100$ km/C=666.67 us, that is to say, the maximum TA of UE in this cell is $TA_{\_max\_FDD} = T_{RTT\_max} = 666.67$ us. If the TA adjustment granularity is delta_TA=0.52 us (i.e., 16 Ts), then M=11. The eNodeB may configure uplink transmission TA for UEs locating at different positions in the cell through different TA commands.

Step 302, pre-configure a TA adjusting offset $T_{UD}$ at the UE side. The TA adjusting offset $T_{UD}$, is the uplink-to-downlink guard period $T_{UD}$ of the TDD system and may be determined by an equation $T_{UD} = \max(T_{UE,Tx-Rx}, T_{eNodeB,Rx-Tx})$ or may be directly transmitted to the UE by the eNodeB.

The above steps 301 and 302 are initiation steps which are performed only once in the initiation phase of the system.

Step 303, the eNodeB in the TDD system performs a synchronization detection on uplink data transmitted by the UE and determines a TA required by the UE for transmitting uplink data.

Step 304, the eNodeB of the TDD system maps the value of the TA into an M-bit TA command according to the TA adjustment indicating table such as Table 2, and notifies the UE of the TA command.

Step 305, the UE receives the M-bit TA command, and maps the TA command into a TA value according to the TA adjustment indicating table such as Table 2.

Step 306, the UE generates a practical uplink transmission TA' by adding the TA value corresponding to the TA command and the TA adjusting offset $T_{UD}$, i.e., $TA' = TA + T_{UD}$.

Step 307, the UE transmits uplink data according to TA', and then returns to step 303.

Figure 4:
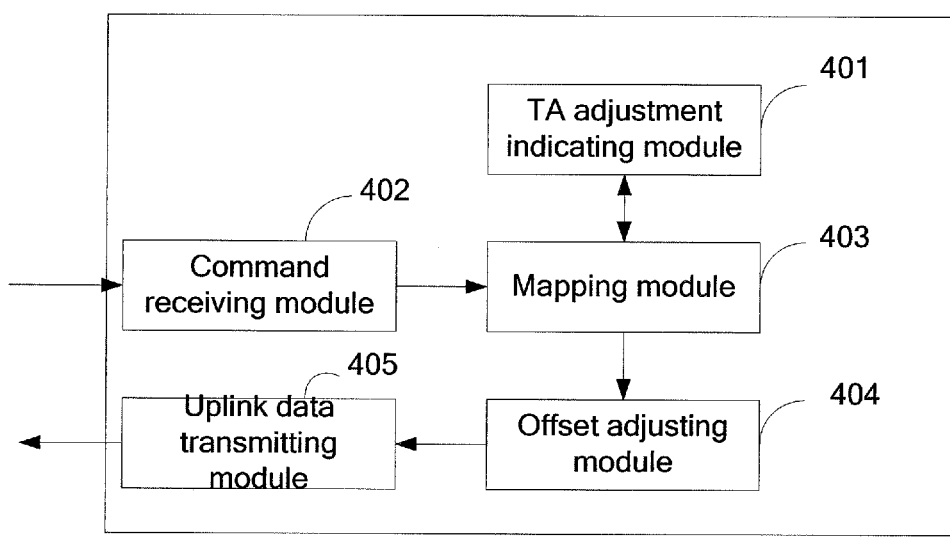
FIG. 4 is a schematic diagram illustrating modules of a UE in accordance with the first embodiment of the present invention.

The UE implementing the process of the above embodiment may be obtained by modifying an existing UE. Specifically, the UE may be as shown in FIG. 4, including the following modules:

a TA adjustment indicating module 401, adapted to configure and store a TA adjustment indicating table, wherein the TA adjustment indicating table includes a relationship between a TA command and a TA value;

a command receiving module 402, adapted to receive the TA command from an eNodeB;

a mapping module 403, adapted to search the TA adjustment indicating table in the TA adjustment indicating module for a TA value corresponding to the TA command received by the command receiving module;

an offset adjusting module 403, adapted to configure and store an uplink-to-downlink guard period $T_{UD}$, and add the TA value obtained by the mapping module 403 and the guard period $T_{UD}$ to obtain an uplink transmission $TA' = TA + T_{UD}$; and an uplink data transmitting module 405, adapted to transmit uplink data according to the TA' obtained by the offset adjusting module 404.

A second embodiment: a TA adjustment indicating table commonly-used by the FDD system and the TDD system is configured in an eNodeB and a UE. The eNodeB in the FDD system and the eNodeB in the TDD system utilize different sub-sets of the TA adjustment indicating table to indicate uplink transmission TA for their respective UEs, i.e., the TDD system and the FDD system use some items of the TA adjustment indicating table in common. The UEs of the FDD system and the TDD system perform the same timing advance operations according to the TA indicated. The UE of the TDD system performs the same processing with that of the FDD system, i.e., transmits uplink data according to the TA received.

In order to guarantee a same TA granularity between the FDD and the TDD systems, the TA adjustment indicating table commonly-used by the TDD and the FDD systems is designed according to a maximum TA dynamic range of the TDD system. The maximum TA in the TDD system $TA_{\_max\_TDD}$ and the maximum TA in the FDD system $TA_{\_max\_FDD}$ meet a following relationship:

$$TA_{\_max\_TDD} = TA_{\_max\_FDD} + T_{UD} \qquad (3)$$

A command of $M' = \lceil (\log_2[1+(TA_{\_max\_FDD}+T_{UD})/\text{delta\_TA}]) \rceil$ bits is required for indicating all TA values within the TA dynamic range $[0, TA_{\_max\_TDD}]$. Since the TA adjustment indicating table is designed according to the TA dynamic range, it can be used by the FDD system and the TDD system in common. The eNodeB of the FDD system utilizes items 0 to $\lceil TA_{\_max\_FDD}/\text{delta\_TA} \rceil$ of the TA adjustment indicating table for indicating TA values in the FDD system. The eNodeB of the TDD system utilizes items $\lceil T_{UD}/\text{delta\_TA} \rceil$ to $\lceil TA_{\_max\_FDD}+T_{UD}/\text{delta\_TA} \rceil$ of the TA adjustment indicating table for indicating TA values in the TDD system. In other words, the TDD system and the FDD system utilize different sets of items of the same TA adjustment indicating table for indicating their respective TA values.

For example, suppose a value of $T_{UD}$ obtained from Table 2 and Equation (2) is 20 us, then $TA_{\_max\_TDD} = TA_{\_max\_FDD} + T_{UD} = 666.67$ us+20 us=686.67 us. Still suppose that the TA adjustment granularity is 0.52 us ($16T_S$), then a command of M'=11 bits is required for quantifying and indicating the TA, and a TA adjustment indicating table as shown in the following may be obtained. The FDD system utilizes items 0 to 1283 for indicating different TA adjustments, while the TDD system utilizes the items 39 to 1321 for indicating different TA adjustments. Rows 39 to 1283 are TA adjustment values commonly-used by the FDD system and the TDD system.

TABLE 3

|     | Serial number | TA command   | TA value (us) |     |
|-----|---------------|--------------|---------------|-----|
| FDD | 0             | 00000000000  | 0             | N/A |
|     | 1             | 00000000001  | 0.52          |     |
|     | 2             | 00000000010  | 1.04          |     |
|     | 3             | 00000000011  | 1.56          |     |
|     | ...           | ...          | ...           |     |
|     | 38            | 00000100110  | 19.76         |     |
|     | 39            | 00000100111  | 20.28         | TDD |
|     | 40            | 00000101000  | 20.8          |     |
|     | ...           | ...          | ...           |     |
|     | 1281          | 10100000001  | 666.12        |     |
|     | 1282          | 10100000010  | 666.64        |     |
|     | 1283          | 10100000011  | 667.16        |     |
| N/A | 1284          | 10100000100  | 667.68        |     |
|     | ...           | ...          | ...           |     |
|     | 1320          | 10100101000  | 686.4         |     |
|     | 1321          | 10100101001  | 686.92        |     |
|     | N/A           | N/A          | N/A           |     |

Figure 5:
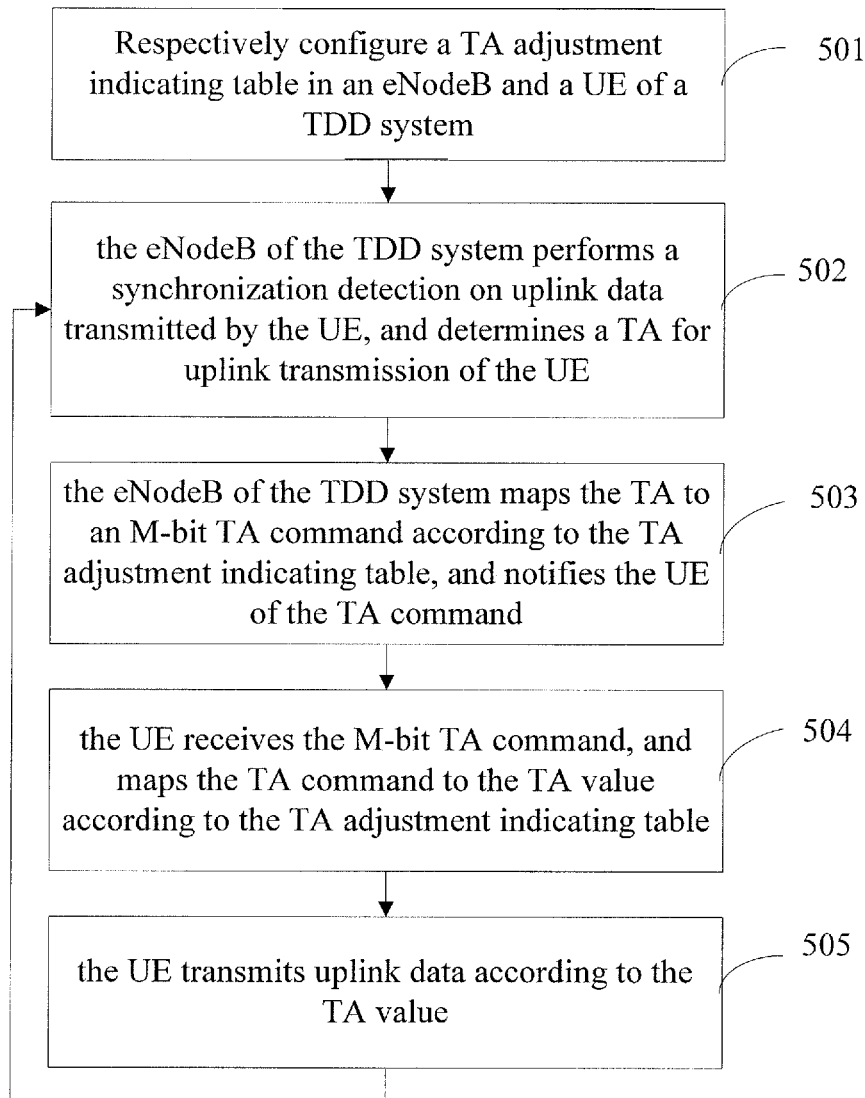
FIG. 5 is a flowchart illustrating a method for implementing indication of uplink transmission timing advance in accordance with a second embodiment of the present invention.

FIG. 5 is a flowchart illustrating a method for implementing indication of uplink transmission TA in accordance with the second embodiment of the present invention. The process may include the following steps.

Step 501, respectively configure a TA adjustment indicating table in an eNodeB and a UE of a TDD system in advance. The TA adjustment indicating table may be as shown in Table 3. The TA adjustment granularity of the TDD system is the same with that of the FDD system. But the TDD system uses a different set of items with the FDD system for indicating TA adjustment values.

Step 502, the eNodeB in the TDD system performs a synchronization detection on uplink data transmitted by the UE, and determines an uplink transmission TA required by the UE for transmitting uplink data next time.

Step 503, the eNodeB of the TDD system maps the value of the uplink transmission TA determined to an M-bit command according to a relationship in the set of items used by the TDD system in the TA adjustment indicating table such as Table 3, and informs the UE of the command.

Step 504, the UE receives the command, and maps the command to a specific TA adjustment value according to the relationship in the set of items used by the TDD system in the TA adjustment indicating table such as Table 3.

Step 505, the UE transmits uplink data according to the TA adjustment value and returns to step 502.

Figure 6:
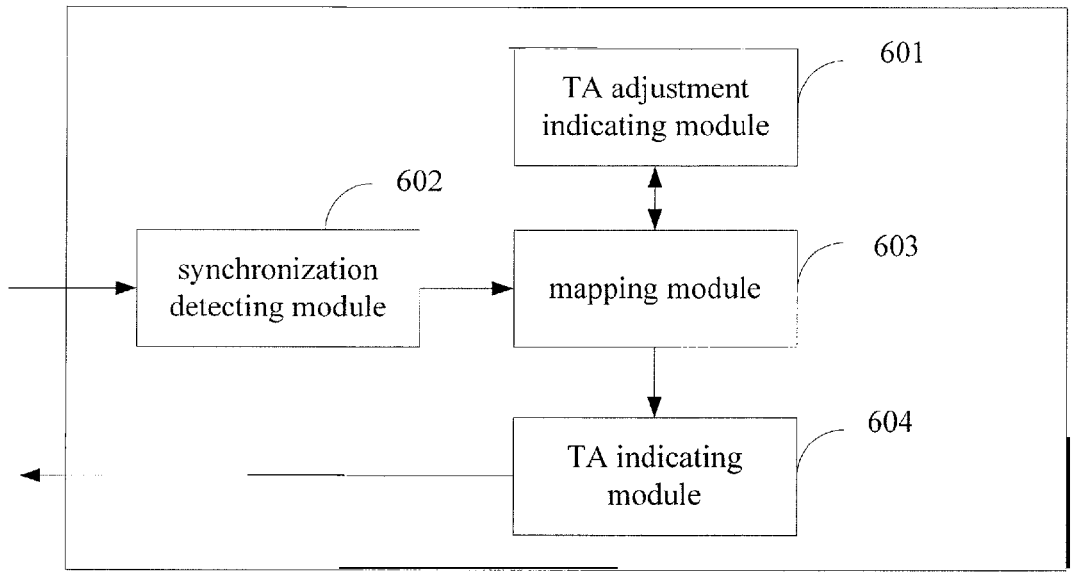
FIG. 6 is a schematic diagram illustrating modules of an eNodeB in accordance with the second embodiment of the present invention.

FIG. 6 is a schematic diagram illustrating modules of an eNodeB implementing the process of the second embodiment. The eNodeB may include:

a TA adjustment indicating module 601, adapted to configure and store a TA adjustment indicating table, wherein the TA adjustment indicating table includes a relationship between a TA command and a TA value, and some items of the TA adjustment indicating table are commonly-used by the TDD system and the FDD system;

a synchronization detecting module 602, adapted to perform a synchronization detection on uplink data received, and determine a TA value for a next uplink transmission of the UE based on a detected result;

a mapping module 603, adapted to search the TA adjustment indicating table in the TA adjustment indicating module for a TA command corresponding to the TA value determined by the synchronization detecting module 602; and a TA indicating module 604, adapted to transmit the TA command obtained by the mapping module 603 to the UE.

Figure 7:
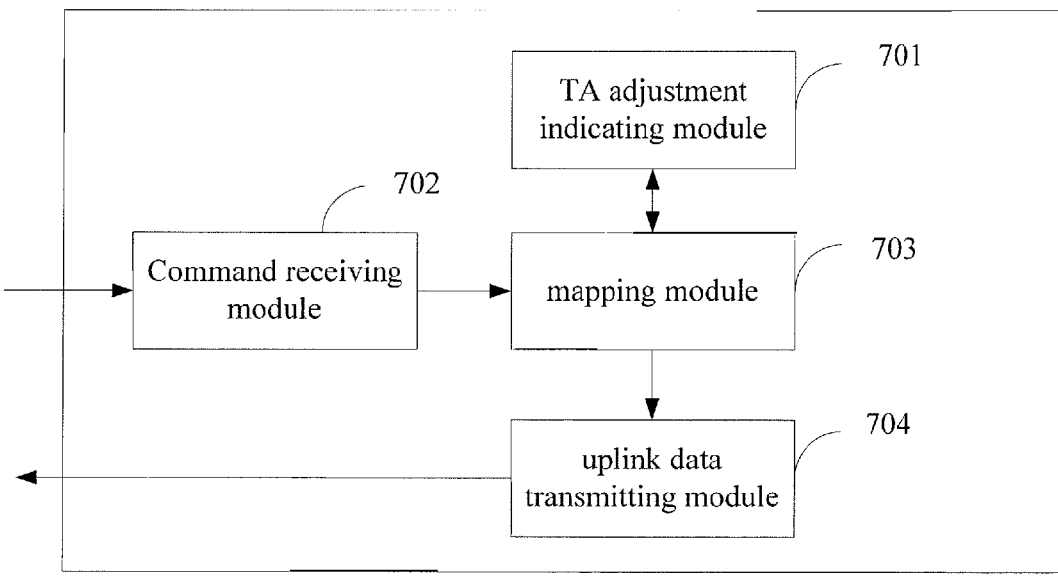
FIG. 7 is a schematic diagram illustrating modules of a UE in accordance with the second embodiment of the present invention.

The structure of the UE may be as shown in FIG. 7, which includes:

a TA adjustment indicating module 701, adapted to configure and store a TA adjustment indicating table, wherein the TA adjustment indicating table includes a relationship between a TA command and a TA value, and some items of the TA adjustment indicating table are commonly-used by the TDD system and the FDD system;

a command receiving module 702, adapted to receive a TA command from an eNodeB;

a mapping module 703, adapted to search the TA adjustment indicating table in the TA adjustment indicating module 701 for a TA value corresponding to the TA command received by the command receiving module 702; and an uplink data transmitting module 704, adapted to transmit uplink data according to the TA value obtained by the mapping module 703.

Embodiments of the present invention provide a specific solution for implementing indication of uplink transmission TA in the TDD system, which fills the blank area of the specifications. The solution achieves coherence of the designs of the TDD system and the FDD system to the largest extent, facilitates the migration of mature processing procedures of the FDD system into the TDD system, and is easy to be implemented in the TDD system.

The structure of the UE may be as shown in FIG. 7, which includes:

a TA adjustment indicating module 701, adapted to configure and store a TA adjustment indicating table, wherein the TA adjustment indicating table includes a relationship between a TA command and a TA value, and some items of the TA adjustment indicating table are commonly-used by the TDD system and the TDD system;

a command receiving module 702, adapted to receive a TA command from an eNodeB;

a mapping module 703, adapted to search the TA adjustment indicating table in the TA adjustment indicating module 701 for a TA value corresponding to the TA command received by the command receiving module 702; and an uplink data transmitting module 704, adapted to transmit uplink data according to the TA value obtained by the mapping module 703.

Embodiments of the present invention provide a specific solution for implementing uplink transmission TA in the TDD system, which fills the blank area of the specifications. The solution achieves coherence of the designs of the TDD system and the FDD system to the largest extent, facilitates the migration of mature processing procedures of the FDD system into the TDD system, and is easy to be implemented in the TDD system.

The foregoing description is only preferred embodiments of the present invention and is not for use in limiting the protection scope thereof. All the modifications, equivalent replacements or improvements in the scope of the present invention's principles shall be included in the protection scope of the present invention.

The invention claimed is:

1. A method for implementing indication of uplink transmission Timing Advance (TA) in a Time Division Duplex (TDD) system, comprising:

receiving, by a User Equipment (UE), a TA command, searching, by the UE, a TA adjustment indicating table for a TA value corresponding to the TA command; wherein the TA adjustment indicating table is pre-configured in the UE, and the TA adjustment indicating table comprises a relationship between the TA command and the TA value; each item in the TA adjusting indicating table is configured the same with a Timing Advance (TA) adjusting indicating table in a Frequency Division Duplex (FDD) system;

wherein the TA adjustment indicating table commonly-used by the TDD system and the FDD system adopts a uniform TA adjustment granularity delta TA, a value range of the TA is from 0 to $TA_{max\_FDD}$, wherein $TA_{max\_FDD}$ denotes a maximum TA of a cell of the FDD system, TAs in the TA adjustment indicating table are arranged in an ascending order according to their values, an eNodeB of the FDD system utilizes items 0 to $[TA_{max\_FDD}/delta\_TA]$ in the TA adjustment indicating table for indicating TAs in the FDD system; an eNodeB of the TDD system utilizes items 0 to

[TA$_{\_max\_FDD}$/delta_TA] in the TA adjustment indicating table, and the symbol ⌈ ⌉ represents a rounding-up function;
adding, by the UE, the TA value corresponding to the TA command and a pre-configured TA adjusting offset in the UE to obtain a practical uplink transmission timing advance TA'; and
transmitting, by the UE, uplink data according to the TA'.

2. The method of claim 1, wherein the TA adjusting offset is an uplink-to-downlink guard period $T_{UD}$ of the TDD system.

3. The method of claim 1, further comprising:
after transmitting the uplink data according to the TA', performing, by an evolved NodeB (eNodeB), a synchronization detection on the uplink data transmitted by the UE, and determining another TA for a next uplink transmission of the UE, and transmitting another TA command corresponding to this TA to the UE.

4. A User Equipment (UE) in a Time Division Duplex (TDD) system, comprising:
a command receiving module, adapted to receive a Timing Advance (TA) command from an eNodeB;
a TA adjustment indicating module, adapted to configure and store a TA adjustment indicating table which includes a relationship between the TA command and a TA value; each item in the TA adjusting indicating table is configured the same with a Timing Advance (TA) adjusting indicating table in a Frequency Division Duplex (FDD) system;
wherein the TA adjustment indicating table commonly-used by the TDD system and the FDD system adopts a uniform TA adjustment granularity delta TA, a value range of the TA is from 0 to TA$_{\_max\_FDD}$, wherein TA$_{\_max\_FDD}$ denotes a maximum TA of a cell of the FDD system, TAs in the TA adjustment indicating table are arranged in an ascending order according to their values, an eNodeB of the FDD system utilizes items 0 to [TA$_{\_max\_FDD}$/delta_TA] in the TA adjustment indicating table for indicating TAs in the FDD system; an eNodeB of the TDD system utilizes items 0 [TA$_{\_max\_FDD}$/delta_TA] in the TA adjustment indicating table, and the symbol ⌈ ⌉ represents a rounding-up function;
a mapping module, adapted to search the TA adjustment indicating table in the TA adjustment indicating module for the TA value corresponding to the TA command received by the command receiving module, and output the TA value to an offset adjusting module;
the offset adjusting module, adapted to configure and store a TA adjusting offset, and add a TA value corresponding to the TA command and the TA adjusting offset to obtain a practical uplink transmission timing advance TA'; and
an uplink data transmitting module, adapted to transmit uplink data according to the TA' obtained by the offset adjusting module.

5. The UE of claim 4, wherein the TA adjusting offset is an uplink-to-downlink guard period $T_{UD}$ in the TDD system.

6. A method for implementing uplink transmission Timing Advance (TA) in a Time Division Duplex (TDD) system, comprising:
performing, by the eNodeB, a synchronization detection on uplink data transmitted by the UE, determining a TA for a next uplink transmission of the UE, mapping the TA to a TA command according to a TA adjustment indicating table configured in the eNodeB, and transmitting the TA command to the UE; wherein some items of the TA adjustment indicating table are commonly-used by the TDD system and a Frequency Division Duplex (FDD) system;
wherein the TA adjustment indicating table commonly-used by the TDD system and the FDD system adopts a uniform TA adjustment granularity delta_TA, a value range of the TA is from 0 to TA$_{\_max\_FDD}$+T$_{UD}$, wherein TA$_{\_max\_FDD}$ denotes a maximum TA of a cell of the FDD system and T$_{UD}$ denotes an uplink-to-downlink guard period of the TDD system; TAs in the TA adjustment indicating table are arranged in an ascending order according to their values, an eNodeB of the FDD system utilizes items 0 to [TA$_{\_max\_FDD}$/delta_TA] in the TA adjustment indicating table for indicating TAs in the FDD system; an eNodeB of the TDD system utilizes items [T$_{UD}$/delta_TA] to [TA$_{\_max\_FDD}$+T$_{UD}$/delta_TA] in the TA adjustment indicating table for indicating TAs in the TDD system, and the symbol ⌈ ⌉ represents a rounding-up function.

7. An eNodeB in a Time Division Duplex (TDD) system, comprising:
a Timing Advance (TA) adjustment indicating module, adapted to configure and store a TA adjustment indicating table, wherein the TA adjustment indicating table includes a relationship between a TA command and a TA, and some items of the TA adjustment indicating table are commonly-used by the TDD system and a Frequency Division Duplex (FDD) system; wherein the TA adjustment indicating table commonly-used by the TDD system and the FDD system adopts a uniform TA adjustment granularity delta_TA, a value range of the TA is from 0 to TA$_{\_max\_FDD}$+T$_{UD}$, wherein TA$_{\_max\_FDD}$ denotes a maximum TA of a cell of the FDD system and T$_{UD}$ denotes an uplink-to-downlink guard period of the TDD system; TAs in the TA adjustment indicating table are arranged in an ascending order according to their values, an eNodeB of the FDD system utilizes items 0 to [TA$_{\_max\_FDD}$/delta_TA] in the TA adjustment indicating table for indicating TAs in the FDD system; an eNodeB of the TDD system utilizes items [T$_{UD}$/delta_TA] to [TA$_{\_max\_FDD}$+T$_{UD}$/delta_TA] in the TA adjustment indicating table for indicating TAs in the TDD system, and the symbol ⌈ ⌉ represents a rounding-up function;
a synchronization detecting module, adapted to perform a synchronization detection on uplink data received, and determine a TA for a next uplink transmission of a User Equipment (UE) based on a detected result;
a mapping module, adapted to search the TA adjustment indicating table in the TA adjustment indicating module for a TA command corresponding to the TA determined by the synchronization detecting module; and
a TA indicating module, adapted to transmit the TA command obtained by the mapping module to the UE.

8. A User Equipment (UE) in a Time Division Duplex (TDD) system, comprising:
a Timing Advance (TA) adjustment indicating module, adapted to configure and store a TA adjustment indicating table, wherein the TA adjustment indicating table includes a relationship between a TA command and a TA, and some items of the TA adjustment indicating table are commonly-used by the TDD system and a Frequency Division Duplex (FDD) system; wherein the TA adjustment indicating table commonly-used by the TDD system and the FDD system adopts a uniform TA adjustment granularity delta_TA, a value range of the TA is from 0 to TA$_{\_max\_FDD}$+T$_{UD}$, wherein TA$_{\_max\_FDD}$ denotes a maximum TA of a cell of the FDD system and $T_{UD}$ denotes an uplink-to-downlink guard period of the TDD system; TAs in the TA adjustment indicating table are arranged in an ascending order according to their values, an eNodeB of the FDD system utilizes items 0 to $\lceil TA_{\_max\_FDD}/delta\_TA \rceil$ in the TA adjustment indicating table for indicating TAs in the FDD system; an eNodeB of the TDD system utilizes items $\lceil T_{UD}/delta\_TA \rceil$ to $\lceil TA_{\_max\_FDD}+T_{UD}/delta\_TA \rceil$ in the TA adjustment indicating table for indicating TAs in the TDD system, and the symbol $\lceil \ \rceil$ represents a rounding-up function;

a command receiving module, adapted to receive a TA command from an eNodeB;

a mapping module, adapted to search the TA adjustment indicating table in the TA adjustment indicating module for a TA value corresponding to the TA command received by the command receiving module; and an uplink data transmitting module, adapted to transmit uplink data according to the TA value obtained by the mapping module.

\* \* \* \* \*